United States Patent

[11] 3,622,847

| [72] | Inventor | Frederick W. Grahame, Glens Falls, N.Y. |
| --- | --- | --- |
| [21] | Appl. No. | 875,224 |
| [22] | Filed | Nov. 10, 1969 |
| [45] | Patented | Nov. 23, 1971 |
| [73] | Assignees | General Electric Company |

[54] FLAG TAP RETENTION MEANS IN CAPACITORS
3 Claims, 4 Drawing Figs.

[52] U.S. Cl.................................................. 317/247,
317/12, 317/258, 317/260
[51] Int. Cl................................................... H01g 1/11
[50] Field of Search........................................ 317/12,
247, 260, 258, 256; 174/25

[56] References Cited
UNITED STATES PATENTS

| 3,194,872 | 7/1965 | Garner......................... | 174/25 |
| --- | --- | --- | --- |
| 2,495,734 | 1/1950 | Katzman...................... | 317/260 X |
| 2,547,644 | 4/1951 | Hogue.......................... | 317/260 X |
| 3,178,622 | 4/1965 | Paul.............................. | 317/256 |
| 3,225,276 | 12/1965 | Daniels......................... | 317/256 |
| 3,363,156 | 1/1968 | Cox............................... | 317/258 X |
| 3,366,853 | 1/1968 | Rayburn....................... | 317/260 |
| 3,389,311 | 6/1968 | Rayno........................... | 317/250 |

*Primary Examiner*—E. A. Goldberg
*Attorneys*—Nathan J. Cornfeld, James J. Lichiello, Frank L. Neuhauser, Oscar B. Waddell and Joseph B. Forman ABSTRACT: In a roll-type capacitor where a lead passes continuously from the roll and through a bushing seal in a casing, the flag tap lead is retained between a paper strip and an electrode strip in the roll by means of a section of yieldable or conforming material which covers the flag tap. During high-temperature impregnation of the capacitor the yieldable strip section conforms to or flows into the irregularities of the adjacent surfaces of the flag tap and the dielectric paper so that frictional retention of the flag tap in the roll is significantly increased.

PATENTED NOV 23 1971
3,622,847
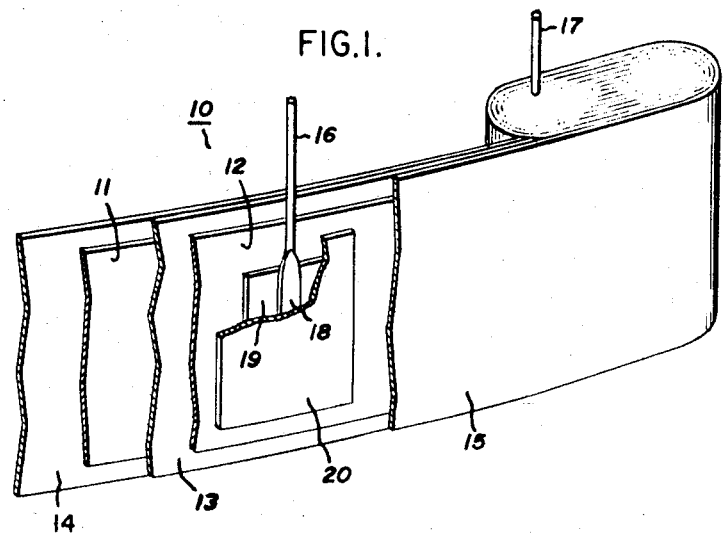
FIG.1.
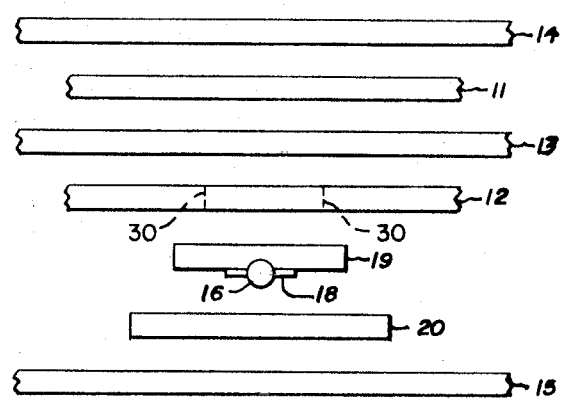
FIG.2.
FIG.4.
FIG.3.
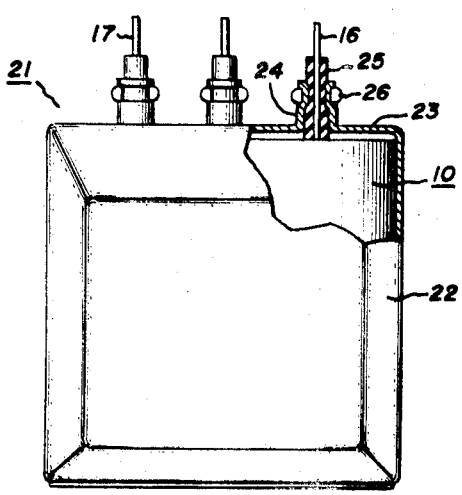
INVENTOR:
FREDERICK W. GRAHAME,
BY James J. Lichiello
HIS ATTORNEY.

FLAG TAP RETENTION MEANS IN CAPACITORS

BACKGROUND OF THE INVENTION

1. Field of the Invention

This invention relates to retention means for flag taps in roll capacitors, and more particularly to a yieldable cover strip for the flag tap which increases the frictional retention forces retaining the flag tap within the roll section.

2. Description of the Prior Art

The capacitor leads for a roll section capacitor are usually thin strip or wire conductors which are inserted into the roll during winding, and are retained therein merely by the frictional forces of the engaging surfaces. Ordinarily, these frictional retaining forces are adequate to retain the lead within the roll section because the leads are joined to further contact member, usually in the cover of a capacitor can or casing, so that the lead is not subjected to any pulling force externally of the capacitor. In those instances where additional retaining force is desired, the capacitor leads may be mechanically joined to a capacitor electrode strip, or welded or otherwise fused thereto. Because of lead location problems within the capacitor roll section and desired variances for automatic equipment for winding roll sections, it is preferably in many instances merely to have the lead placed within the roll section without any significant joining. Where additional retaining force is desirable, the lead itself may be suitably joined to a small section or flag of aluminum foil which is then positioned within a roll section so that a larger area is available for frictional retaining force.

With the advent of an extended lead capacitor, such as illustrated and described in U.S. Pat. No. 3,389,311, Rayno, assigned to the same assignee as the present invention, greater tap lead retaining forces have been necessary. The lead for this kind of capacitor extends directly from the roll section and through a bushing or sleeve seal in a casing cover. Because of the characteristics of this seal, it is possible to exert sufficient pull on a capacitor lead so that it slides through the bushing without significantly affecting the seal, but moving the flag tap lead within the capacitor roll section. This movement may result in a tearing of adjacent insulation and arcing of the capacitor or a partial removal of the lead from the roll so that electrical contact surface area is severely diminished. Therefore, because of the high desirabilty to use flag tap leads and bushing seals in straight through lead capacitors as described, additional retention means for the flag taps are necessary.

SUMMARY OF THE INVENTION

Accordingly, it is an object of this invention to provide improved capacitor lead retention means within a capacitor roll section.

It is a further object of this invention to provide a frictional cover member for flag tap leads in a capacitor roll section where the lead passes continuously from the roll and through a seal in a capacitor housing.

It is yet another object of this invention to provide a yieldable cover member between the flag of a flag tap lead, and an adjacent paper dielectric where the lead passes continuously from the capacitor roll through a bushing seal in a capacitor housing.

These and other objects of this invention will be better understood when taken in connection with the following description and the drawings in which:

BRIEF DESCRIPTION OF THE DRAWINGS

FIG. 1 illustrates one preferred embodiment of this invention in the form of a partly unrolled roll capacitor.

FIG. 2 illustrates in schematic form the arrangement of the elements of this invention including the friction retention cover means for the flag tap.

FIG. 3 represents the complete capacitor including the roll section of FIG. 1 in the bushing seal kind of can or casing.

FIG. 4 illustrates a modification of the cover means of FIG. 2.

Briefly described, this invention in one of its preferred embodiments includes a small section of a synthetic resin material which covers the flag tap within a capacitor roll section. During the high-temperature impregnation of the capacitor, the synthetic resin cover yields or conforms to the irregularities of both the flag tap and the adjacent paper to frictionally retain the flag tap within the roll section in opposition to any pulling forces tending to move the flag tap out of the roll section.

DESCRIPTION OF THE PREFERRED EMBODIMENTS

Referring now to FIG. 1, there is illustrated a capacitor roll section 10 much like the capacitor roll section shown in the above noted U.S. Pat. No. 3,389,311 Rayno. Roll section 10 includes a pair of electrode foil strips 11 and 12, usually aluminum, with a dielectric strip 13 therebetween which is usually a pair of paper strips. A further pair of paper strips, an inner strip 14 and an outer strip 15, completes the section which is wound in the convolute form as illustrated. Electrical connection is brought out from the foil strips 11 and 12 by means of leads 16 and 17. In one preferred form of this invention, leads 16 and 17 are wire leads and may be of tinned copper wire. These leads are suitably flattened at one end to provide a flattened section 18 which is more suitable for welding or otherwise joining to a short foil strip 19. The short foil strip 19 is sometimes referred to as the flag and the combination of wire 16 and section 19 is known as a flag tap.

Flag 19 is usually narrower than the adjacent foil strip 12 and considerably less than the length of the foil strip 12. In one practice of this invention where the convolute as illustrated is about 2-inches high, the flag 19 is about 1 inch in the vertical dimension and about 4 inches in length, along the roll. A wire lead such as lead 16 may be joined to a flag 19 by various means including mechanical fixing, bonding, or welding, and preferably by spot welding. It is desirable that flag 19 not be fixedly joined to the electrode strip 12 because of the considerable variances in the positioning of the flag tap lead 16 in the roll during automatic winding of the roll. Additionally, high speed automatic winding of a roll form 10 would be increasingly difficult if provisions were necessary to fixedly join the flag taps to the electrodes during the winding process.

Referring now to FIG. 2, there is illustrated schematically an expanded view of the present invention. In FIG. 2 cover member 20 is shown as being adjacent the lead 16 and its flattened section 18, as well as adjacent flag 19. It is understood that the flag tap arrangement could be reversed where the wire lead 16 would be adjacent the foil electrode 12. By the same token, the flag tap 19 may be positioned adjacent the opposite side of foil strip 12. Ordinarily the cover member 20 is of greater width than the foil flag 19 and preferably of greater length, as illustrated. However, the length of the cover member 20 may be less than or closely approximate the length of the flag 19. In one practice of this invention, a 4-inch length of both members has provided good results. Best results are obtained in this invention when a flag 19 is utilized, but it is also contemplated that the wire lead may merely have an enlarged section such as the flattened section 18, or any other suitable enlarged section, the flag being in a sense an enlarged section at the end of the lead.

The fact that the flag 19 may not be fixedly joined to the electrode 12 provides no inherent difficulties in ordinary capacitor construction where the roll capacitor is utilized within a sealed can and the wire leads 16 and 17 are joined to internal terminals in the can. Suitable examples of this type of construction are shown in U.S. Pat. Nos. 3,178,622 3,365,632, both assigned to the same assignee as the present invention. However, a capacitor casing or can may be employed wherein the capacitor lead extends continuously or directly from the capacitor roll through a bushing type seal in the capacitor can to the external connection. Such a can is shown for example in FIG. 3 where wire lead 16 passes through a bushing seal 24 in the cover of the can and thereafter extends directly into the capacitor roll. In this kind of construction, an external force applied to lead 16 may move lead 16 axially in the bushing seal and consequently displace the flag tap as illustrated in FIG. 1 of this invention or crumple or otherwise tear the flag tap so that capacitor failure occurs due to arcing.

It has been discovered that the utilization of a yielding or conforming material member between the flag tap and an adjacent paper dielectric, to conform to both surfaces, provides the kind of frictional retention forces necessary in a capacitor of the kind shown in FIG. 3 to withstand excessive pulling forces on the wire lead 16.

In one preferred form of this invention, the conforming member is illustrated as member 20 of FIG. 1, and is preferably of a synthetic resin material, such a polypropylene, of about 0.001-inch thickness. Cover 20 is positioned over the flag 19 and between flag 19 and paper dielectric 15. Best results are obtained when the plastic yielding or conforming cover member 20 covers all edges of the flag 19. Polypropylene coated paper or paper-polypropylene composites have been employed for member 20 with good results. One example of such an embodiment is the composite 27 of FIG. 4. In FIG. 4 composite 27 includes a layer of a polyolefin material 28 provided with a suitable paper backing 29. The paper backing 29 is adjacent the paper dielectric strip 157 FIG. 2. The backing adds to dielectric strength at the critical tap area and does not detract from pull strength of the assembly.

While the cover 20 may comprise a number of synthetic resins or other dielectric materials, it is a requirement that cover member 20 be compatible with the remaining materials in the capacitor, particularly the kind of liquid dielectric impregnant utilized to impregnate the capacitor section. At the same time the material for member 20 must be conformable or yieldable under prescribed conditions so that it is caused to yield, conform, or flow into the surface irregularities of both the paper dielectric 15, the flag 19, and the flattened section 18. If the surface irregularities or deformities between the flag 19 and paper dielectric 15 are filled by the flowable material of the resin cover member 20, then the flag 19 or the wire lead 16 is more strongly retained within the capacitor roll section, and has a pull strength resistance significantly greater than without such a cover member.

In the invention as disclosed in FIG. 3 for example, drying of the capacitor usually occurs at a temperature approaching about 165° C. At this temperature, the polypropylene becomes considerably softened so that it flows or otherwise conforms to the present surface irregularities or deformities of both the paper dielectric and the wire lead and flag combination. However, the usual operating temperature is much below 165° C. where the polypropylene is not flowable, for the purposes of this invention. Accordingly, the flag tap and cover are tightly retained in the roll and withstand pull tests of as much as 10 pounds on a lead external to the casing.

Best results are obtained in this invention when the flag 19 is adjacent a continuous foil strip 12 underneath as illustrated in FIG. 1. Where the foil strip 12 is parted so that flag 19 may be utilized as a fusible element, as in the above noted U.S. Pat. No. 3,178,622, the cover member 20 also provides a significantly greater pull resistance for the wire lead 16. In FIG. 2, the dash lines 30 in foil strip 12 represent the ends of a split foil design where the flag 19 is of a fusible material and spans the split.

The capacitor roll section 10 of FIG. 1 in rolled form is utilized in a capacitor casing combination as illustrated in the noted U.S. Pat. No. 3,389,311, an example of which is illustrated in FIG. 3 of this invention. In FIG. 3, capacitor 21 includes a can member 22 which is hermetically sealed and contains the roll section 10 of FIG. 1 therein. In the cover member 23, there are on or more bushing seals 24 through which leads 16 and 17 project. Leads 16 and 17 are similar to those leads 16 and 17 of FIG. 1 of this invention and connect directly to the capacitor section 10, as illustrated in FIG. 1, while at the same time passing directly through the bushing seals 24 to make electrical connection with the particular apparatus with which the capacitor is associated. As illustrated in FIG. 3, lead 16 is surrounded by a sleeve 25 of a flexible or rubbery material such as silicone rubber. Bushing seal 24 also includes a crimped section 26 which circumferentially compressibly engages the silicone rubber sleeve 25 to effectively seal the capacitor casing and the impregnant therein. In this particular kind of a seal, intended or unintended pull forces on the lead 16 may actually move lead 16 through the sleeve 25 without destroying the seal characteristics of the bushing seal. The effect of this movement may result in tearing the wire lead 16 of FIG. 1 from its flag 19, or displacing the lead assembly so that adjacent dielectric materials are torn and capacitor shorting takes place. By means of the present invention as applicable to the capacitor of FIG. 3, considerable tolerance is provided in the pull forces which may be imposed on lead 16 because of the increased retentive ability of lead 16 due to the use of the cover member 20.

In other capacitors where the lead 16 may be joined to a terminal button within the casing 22, the present invention is less applicable because there is usually no direct pull on the lead involved. Where there may be some pull on the lead or on the terminal button, the lead usually comprises sufficient compromising length so that some cover or terminal motion is accommodated through the extra length of lead involved. Accordingly, the invention is specifically adaptable to the kind of capacitor as illustrated in either FIG. 3 where the lead between the roll section and the external connection may be subjected to pulling forces which would move the lead in the casing 22.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an impregnated capacitor roll section which is exposed to an elevated processing temperature above about 160° C. and sealed in a casing, and wherein said roll section has capacitor wire leads extending continuously from a foil electrode of the capacitor roll section through a friction seal in said housing so that a pulling force on said wire lead can move said lead in said friction sleeve seal, the combination of a finally processed capacitor comprising
   a. a casing
   b. a capacitor roll section in said casing and impregnated with a liquid dielectric impregnant
   c. a continuous wire lead extending from said roll section through said casing
   d. a friction sleeve sealing means in said casing through which said wire lead extends
   e. said roll section comprising a pair of foil strips and a dielectric strip therebetween
   f. a paper strip adjacent one of said foil strips strips opposite to said dielectric strip
   g. a foil flag attached to one end of said wire lead and aligned adjacent one of said foil electrodes between said electrode and said paper strip
   h. a heat softening synthetic resin material strip member which is heat softenable at an elevated temperature above about 160° C. next adjacent said flag and between said flag and said paper and flowingly impressed into the surface irregularities of each and flowmolded about said lead to increase the frictional forces retaining said lead in said roll.

2. The invention as recited in claim 1 wherein the foil electrode adjacent flag is split and said flag is a fusible element bridging said split.

3. The invention as recited in claim 1 wherein said synthetic strip member comprises a laminate of a strip of polyolefin and a strip of paper, the said laminate being positioned in said capacitor roll so that the polyolefin is in direct contact with said wire lead.

* * * * *